(12) United States Patent
Imoto et al.

(10) Patent No.: US 12,294,923 B2
(45) Date of Patent: May 6, 2025

(54) VEHICLE AND IN-VEHICLE DEVICE

(71) Applicant: TOYOTA JIDOSHA KABUSHIKI KAISHA, Aichi-ken (JP)

(72) Inventors: Masayuki Imoto, Susono (JP); Jun Miyagawa, Numazu (JP); Yasue Mano, Numazu (JP); Ayako Nakamura, Shizuoka-ken (JP); Naohiro Seo, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 360 days.

(21) Appl. No.: 17/739,172

(22) Filed: May 9, 2022

(65) Prior Publication Data
US 2023/0025660 A1   Jan. 26, 2023

(30) Foreign Application Priority Data
Jul. 16, 2021   (JP) .................... 2021-118282

(51) Int. Cl.
*H04W 4/46* (2018.01)
*H04L 67/75* (2022.01)
*H04W 84/18* (2009.01)

(52) U.S. Cl.
CPC ............ *H04W 4/46* (2018.02); *H04L 67/75* (2022.05); *H04W 84/18* (2013.01)

(58) Field of Classification Search
CPC .......... H04W 4/46; H04W 84/18; H04L 67/75
See application file for complete search history.

(56) References Cited

U.S. PATENT DOCUMENTS

2005/0270152 A1* 12/2005 Harumoto ............ B60R 25/102
340/988

FOREIGN PATENT DOCUMENTS

| CN | 102792208 A | * | 11/2012 | ............. B60K 35/00 |
| JP | 2010-205118 A | | 9/2010 | |
| JP | 2015153019 A | | 8/2015 | |
| WO | WO-2014196171 A1 | * | 12/2014 | ............... B60R 1/00 |

\* cited by examiner

*Primary Examiner* — Duc C Ho
(74) *Attorney, Agent, or Firm* — HAUPTMAN HAM, LLP

(57) ABSTRACT

A vehicle includes a processor that includes hardware. When an own vehicle is connected to an external network via a communication mesh network created by vehicle-to-vehicle communication that takes place between multiple vehicles, the processor outputs connection information indicating that the own vehicle is connected to the external network as information that is able to be visually recognized from outside of the vehicle.

20 Claims, 3 Drawing Sheets

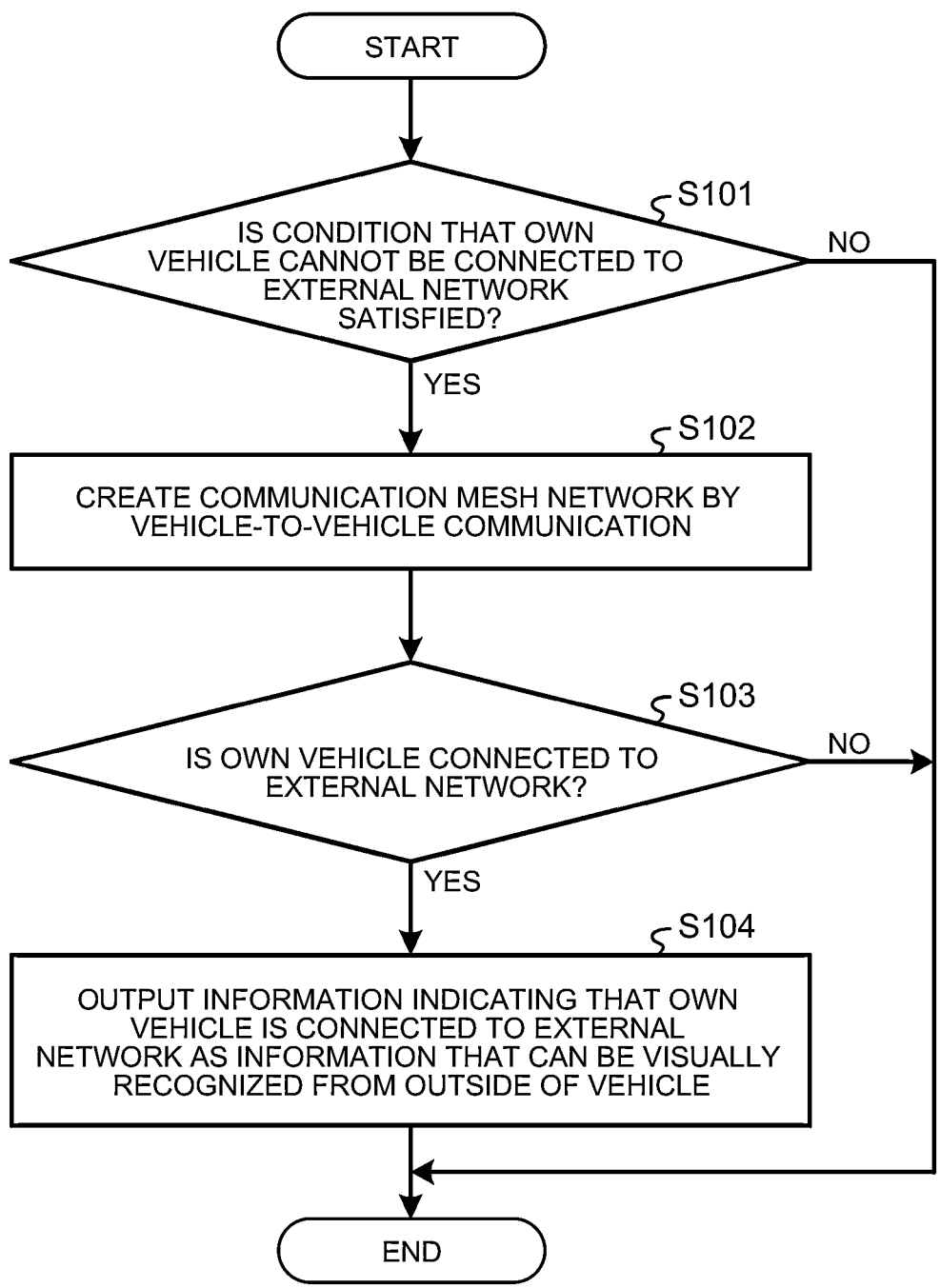

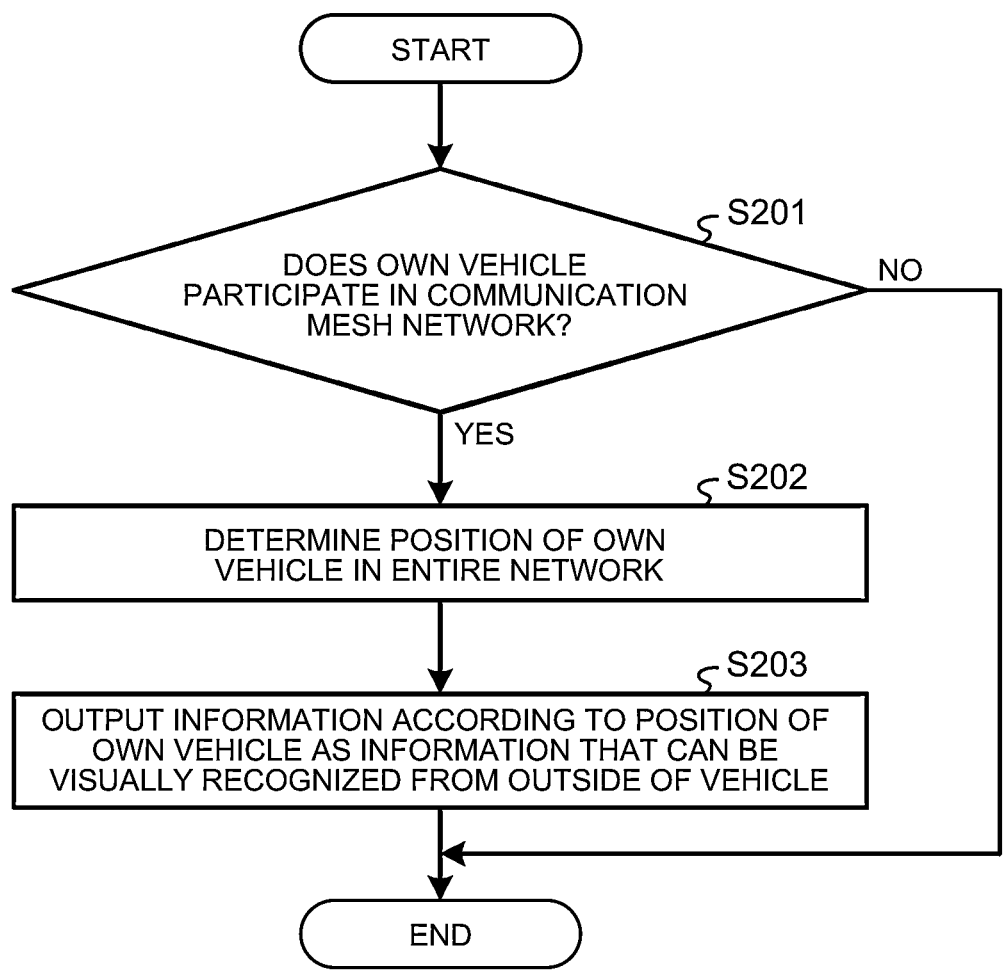

VEHICLE AND IN-VEHICLE DEVICE

CROSS-REFERENCE TO RELATED APPLICATION

This application claims priority to Japanese Patent Application No. 2021-118282 filed on Jul. 16, 2021, incorporated herein by reference in its entirety.

BACKGROUND

1. Technical Field

The present disclosure relates to a vehicle and an in-vehicle device.

2. Description of Related Art

Japanese Unexamined Patent Application Publication No. 2015-153019 (JP 2015-153019 A) discloses a method of providing information for guiding a user to an appropriate evacuation site by a vehicle that obtains information on the evacuation site via road-to-vehicle communication or vehicle-to-vehicle communication and transmits the information on the evacuation site to a display terminal even when a communication failure occurs in a network at the time of a disaster.

SUMMARY

By the way, it is considered that a communication mesh network is created when multiple vehicles perform vehicle-to-vehicle communication. In this case, the entire network of the communication mesh network can be expanded when a new vehicle participates in vehicle-to-vehicle communication. Further, when any of the vehicles is connected to an external network such as the Internet, all the vehicles participating in the communication mesh network can be connected to the external network.

Therefore, for example, at the time of a disaster, it is expected that information will be obtained from the external network via the communication mesh network created by the vehicle-to-vehicle communication. At that time, it is assumed that an evacuee who is evacuating on foot searches for a vehicle participating in the communication mesh network in an attempt to obtain information from the external network. However, it is not possible to determine from the outside of the vehicle which vehicle is participating in the communication mesh network.

The present disclosure has been made in view of the above circumstances, and an object of the present disclosure is to provide a vehicle and an in-vehicle device capable of determining a vehicle participating in a communication mesh network from the outside of the vehicle.

A vehicle according to the present disclosure includes a processor that includes hardware. When an own vehicle is connected to an external network via a communication mesh network created by vehicle-to-vehicle communication that takes place between multiple vehicles, the processor outputs connection information indicating that the own vehicle is connected to the external network as information that is able to be visually recognized from outside of the vehicle.

An in-vehicle device according to the present disclosure includes a processor that includes hardware. When an own vehicle is connected to an external network via a communication mesh network created by vehicle-to-vehicle communication that takes place between multiple vehicles, the processor outputs connection information indicating that the own vehicle is connected to the external network as information that is able to be visually recognized from outside of the vehicle.

According to the present disclosure, a vehicle participating in the communication mesh network can be determined from the outside of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing a communication control flow; and

FIG. 4 is a flowchart showing a control flow for determining a position of an own vehicle.

DETAILED DESCRIPTION OF EMBODIMENTS

Hereinafter, a vehicle and an in-vehicle device according to an embodiment of the present disclosure will be specifically described with reference to the drawings. The present disclosure is not limited to the embodiment described below.

Figure 1:
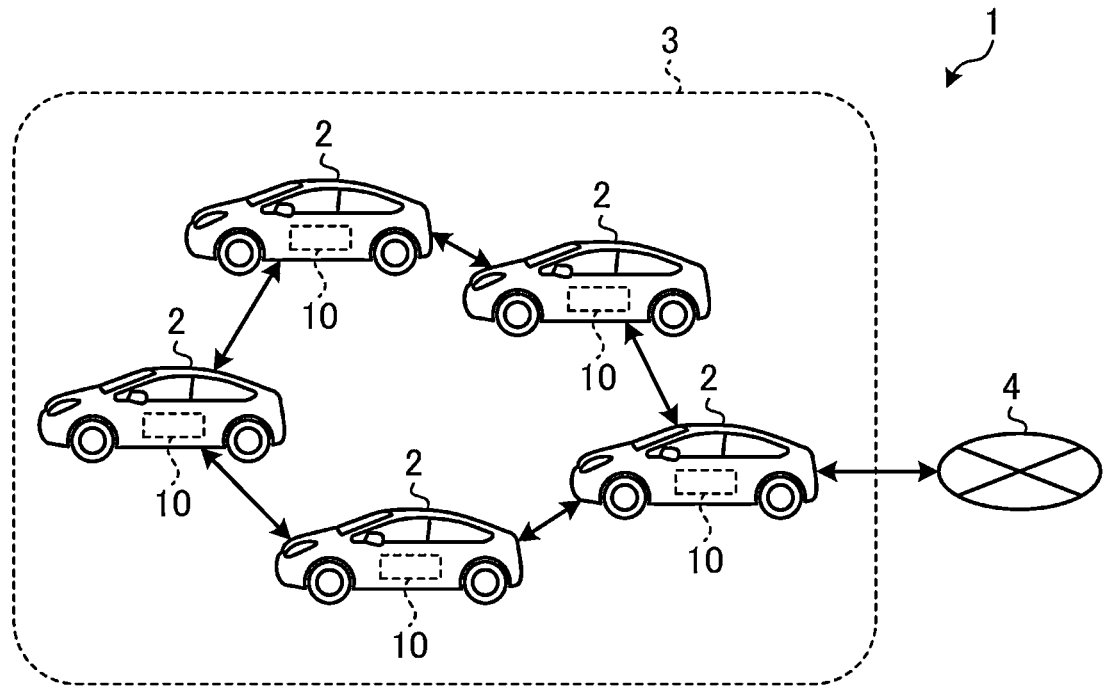
FIG. 1 is a diagram showing a schematic configuration of a communication system according to an embodiment.

FIG. 1 is a diagram showing a schematic configuration of a communication system according to the embodiment. A communication system 1 is configured to include a communication mesh network 3 created by vehicle-to-vehicle communication that takes place between multiple vehicles 2 and an external network 4 such as the Internet. In this communication system 1, the communication mesh network 3 and the external network 4 are connected to be able to communicate with each other. Therefore, information can be exchanged between the multiple vehicles 2 creating the communication mesh network 3 and an external device connected to the external network 4. This external device includes various devices such as a server.

The vehicle 2 includes an in-vehicle device 10 that performs wireless communication (vehicle-to-vehicle communication) between an own vehicle and another vehicle. Therefore, it is possible for the adjacent vehicles 2 to perform vehicle-to-vehicle communication within a range in which the communication is enabled using the in-vehicle devices 10. Further, one vehicle 2 performs vehicle-to-vehicle communication with multiple vehicles 2, so that the multiple vehicles 2 can be connected to be able to communicate with each other by vehicle-to-vehicle communication. As a result, the communication mesh network 3 by the multiple vehicles 2 is created.

The communication mesh network 3 is a communication network in which multiple vehicles 2 form a transmission route in a mesh shape and transfer data in a relay manner. The data in the communication mesh network 3 is repeatedly transferred and sent to the vehicle 2 that is a destination in a relay manner Therefore, the multiple vehicles 2 creating the communication mesh network 3 can acquire the data possessed by the other vehicles. Further, as shown in FIG. 1, when any of the multiple vehicles 2 participating in the communication mesh network 3 can be connected to be able to communicate with the external network 4, all the vehicles 2 participating in the communication mesh network 3 can be connected to the external network 4.

The external network 4 is a communication network created by the Internet, a telecommunications carrier, or the like, or a communication network created by a local government. That is, the external network 4 is a communication network created externally with respect to the communication mesh network 3.

For example, it is considered that information is acquired from the external network 4 by using the communication mesh network 3 created by the multiple vehicles 2 when a disaster occurs. It is assumed that due to the occurrence of a disaster, the vehicle 2 cannot wirelessly communicate with a nearby base station, and the vehicle 2 cannot be directly connected to the external network 4 from the own vehicle. In addition, it is assumed that a person who was in a disaster area at the time of the disaster loses the means of communication with the external network 4, for example, the person cannot carry a mobile terminal such as a smart phone with the person. Therefore, the in-vehicle device 10 of the vehicle 2 executes communication control for connecting to the external network 4 via the communication mesh network 3.

In this case, it is assumed that the person who is evacuating on foot or the like searches for the vehicle 2 connected to the external network 4 in an attempt to obtain means of communication with the external network 4. Therefore, the vehicle 2 participating in the communication mesh network 3 outputs information indicating that the own vehicle is connected to the external network 4 via the communication mesh network 3 as information that can be visually recognized from the outside of the vehicle.

Figure 2:
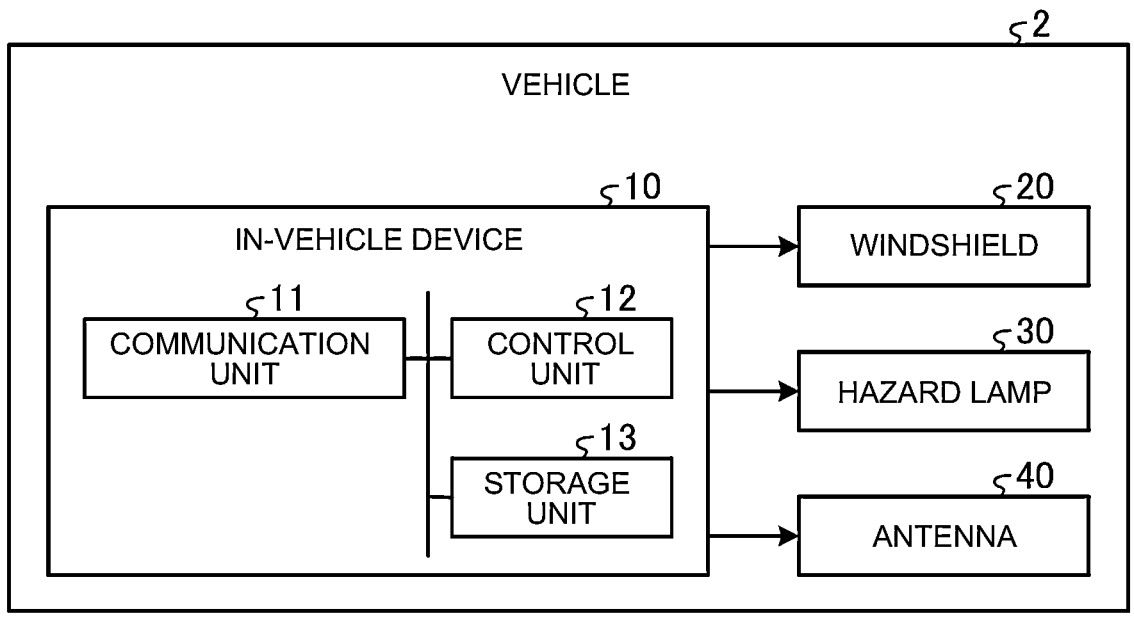
FIG. 2 is a block diagram illustrating a configuration of a vehicle.

FIG. 2 is a block diagram illustrating a configuration of the vehicle. The vehicle 2 includes the in-vehicle device 10, a windshield 20, a hazard lamp 30, and an antenna 40.

The in-vehicle device 10 is a device mounted on the vehicle 2, and is configured to include an electronic control unit for controlling the vehicle 2. The in-vehicle device 10 includes a communication unit 11, a control unit 12, and a storage unit 13.

The communication unit 11 is a communication device for performing wireless communication with the external device outside of the vehicle 2. The communication unit 11 is configured to include a short-range communication unit that performs wireless communication with another vehicle and a long-range communication unit that performs wireless communication with a base station. The in-vehicle device 10 can create the communication mesh network 3 by vehicle-to-vehicle communication with the other vehicle using the short-range communication unit. Further, the in-vehicle device 10 can be directly connected to the external network 4 by wireless communication with the base station using the long-range communication unit. That is, the in-vehicle device 10 is connected to the external network 4 by the communication unit 11 via the base station of mobile communication, and performs communication with the other device via the external network 4.

The control unit 12 includes a processor and a memory. The processor is composed of a central processing unit (CPU), a digital signal processor (DSP), a field-programmable gate array (FPGA), and the like. The memory is a main storage device, and is composed of a random access memory (RAM), a read-only memory (ROM), and the like. The control unit 12 loads a program stored in the storage unit 13 into the work area of the memory (main storage device) and executes the program, and controls each component, etc. through the execution of the program such that the function that satisfies a predetermined purpose can be realized.

The storage unit 13 is composed of a recording medium such as erasable programmable ROM (EPROM). The storage unit 13 stores various programs executed by the control unit 12. As an example, the storage unit 13 stores a program for controlling wireless communication using the communication unit 11. Further, the storage unit 13 stores information acquired by the communication unit 11 via wireless communication.

Therefore, the control unit 12 executes communication control based on the program stored in the storage unit 13. The communication control includes short-range communication control in which the communication unit 11 performs vehicle-to-vehicle communication with the other vehicle, and long-range communication control in which the communication unit 11 performs wireless communication with the base station. The control unit 12 executes the short-range communication control and controls communication between the communication unit 11 and the other vehicle. The communication distance in the vehicle-to-vehicle communication is shorter than the communication distance in the long-range communication, and changes according to the surrounding environment of the vehicle 2.

Further, the control unit 12 executes the long-rage communication control and controls the communication between the communication unit 11 and the base station to control the communication with the external network 4 via the base station.

Further, the control unit 12 executes control for creating the communication mesh network 3 (mesh creation control) as communication control. The control unit 12 controls vehicle-to-vehicle communication between the own vehicle and the other vehicle by executing mesh creation control, and constructs the communication mesh network 3 created by vehicle-to-vehicle communication that takes place between the multiple vehicles 2.

Further, the control unit 12 executes control (control via network) for connecting to the external network 4 via the communication mesh network 3. The control unit 12 controls vehicle-to-vehicle communication between the own vehicle and the other vehicle by executing the control via network, and controls communication with the external network 4 via the communication mesh network 3.

That is, when being connected to the external network 4, the in-vehicle device 10 can be directly connected to the external network 4 from the own vehicle, and also can be connected to the external network 4 via the communication mesh network 3.

For example, when the in-vehicle device 10 can be directly connected to the external network 4 by the communication unit 11 in normal times and the like, the control unit 12 controls communication with the external network 4 in this connection state. On the other hand, when the in-vehicle device 10 cannot be directly connected to the external network 4 by the communication unit 11 at the time of a disaster and the like, the control unit 12 controls the communication unit 11 to create the communication mesh network 3 and connects the own vehicle and the external network 4 via the communication mesh network 3.

Then, the control unit 12 outputs information indicating that the own vehicle is connected to the external network 4 via the communication mesh network 3 as information that can be visually recognized from the outside of the vehicle. That is, the control unit 12 executes notification control for notifying the person outside of the vehicle that the own vehicle is connected to the external network 4. Examples of the output destination of the information include the windshield 20, the hazard lamp 30, and the antenna 40.

Specifically, the control unit 12 executes display control for displaying information on the windshield 20 as notification control. The in-vehicle device 10 includes a display device for displaying various kinds of information on the windshield 20. This display device is a so-called head-up display. Then, the control unit 12 can execute display control for displaying information on the windshield 20 and display various kinds of information on the windshield 20. In this case, the information displayed on the windshield 20 includes character information. That is, the in-vehicle device 10 displays the character information indicating that the own vehicle is connected to the external network 4 via the communication mesh network 3, for example, a message such as "connecting to the external network" on the windshield 20. When the communication connection is disconnected from the state in which the own vehicle is connected to the external network 4, the in-vehicle device 10 can display history information indicating that the vehicle 2 has been connected to the external network 4 via the communication mesh network 3 on the windshield 20. This history information includes character information. Further, the history information is generated by the control unit 12 and stored in the storage unit 13. For example, the control unit 12 can display the history information indicating that the vehicle 2 has been connected to the external network 4 from the current time to several tens of minute s ago as character information on the windshield 20.

Further, the control unit 12 executes blinking control for blinking the hazard lamp 30 as notification control. Then, when the vehicle 2 is connected to the external network 4, the control unit 12 blinks the hazard lamp 30 such that the hazard lamp 30 is in a blinking state different from a normal blinking state. For example, the control unit 12 blinks the hazard lamp 30 at an interval longer than a normal blinking interval while the vehicle 2 is connected to the external network 4. When the communication connection is disconnected from the state in which the vehicle 2 is connected to the external network 4, the control unit 12 can turn off the blinking hazard lamp 30.

Further, the control unit 12 executes extension-retraction control for automatically extending and retracting the antenna 40 as notification control. The antenna 40 is an antenna that receives broadcast radio waves such as a television, radio, or the like. Then, when the vehicle 2 is connected to the external network 4, the control unit 12 extends the antenna 40 such that the length thereof is different from the normal length. For example, the control unit 12 extends the antenna 40 such that the length thereof is longer than the normal length while the vehicle 2 is connected to the external network 4. When the communication connection is disconnected from the state in which the vehicle 2 is connected to the external network 4, the control unit 12 can retract and store the antenna 40.

FIG. 3 is a flowchart showing a communication control flow. The control shown in FIG. 3 is repeatedly performed by the control unit 12.

The control unit 12 determines whether a condition that the own vehicle cannot be directly connected to the external network 4 is satisfied (step S101). In step S101, it is determined whether the condition that the own vehicle cannot be connected to the external network 4 in the communication between the own vehicle and the base station by the long-range communication control is satisfied. For example, in step S101, the control unit 12 determines whether a state in which the own vehicle cannot be connected to the external network 4 has continued for a predetermined period.

When the condition that the own vehicle cannot be directly connected to the external network 4 is not satisfied (step S101: No), this control routine ends. When the determination result is No in step S101, the control unit 12 determines that the communication connection in normal times is possible.

When the condition that the own vehicle cannot be directly connected to the external network 4 is satisfied (step S101: Yes), the control unit 12 creates the communication mesh network 3 by vehicle-to-vehicle communication by the communication unit 11 (step S102). In step S102, the control unit 12 executes control for creating the communication mesh network 3, and the own vehicle participates in the communication mesh network 3.

Then, the control unit 12 determines whether the own vehicle is connected to the external network 4 via the communication mesh network 3 (step S103). In step S103, it is determined whether the communication mesh network 3 in which the own vehicle participates is connected to the external network 4.

When it is determined that the own vehicle is not connected to the external network 4 via the communication mesh network 3 (step S103: No), this control routine ends. When the determination result is No in step S103, it means that the communication mesh network 3 is created, but none of the vehicles 2 participating in the communication mesh network 3 is connected to the external network 4.

When it is determined that the own vehicle is connected to the external network 4 via the communication mesh network 3 (step S103: Yes), the control unit 12 outputs information indicating that the own vehicle is connected to the external network 4 as information that can be visually recognized from the outside of the vehicle (step S104). In step S104, the notification control by the control unit 12 is executed. This notification control includes any one of display control for displaying information on the windshield 20, blinking control for blinking the hazard lamp 30, and extension-retraction control for extending the antenna 40. When the process of step S104 is performed, this control routine ends.

As described above, according to the embodiment, even when the vehicle cannot be connected to the external network 4 via the base station in the area due to the occurrence of a disaster, for example, the vehicle can be connected to the external network 4 via the communication mesh network 3 created by vehicle-to-vehicle communication that takes place between the multiple vehicles 2. Then, various kinds of information such as disaster information can be acquired from the external network 4. At that time, the vehicle 2 outputs information indicating that the own vehicle is connected to the external network 4 via the communication mesh network 3 as information that can be visually recognized from the outside of the vehicle. As a result, a person outside of the vehicle 2 can visually recognize the information, so that, for example, a person evacuating on foot can determine which vehicle 2 is connected to the external network 4.

Further, even when the vehicle 2 alone does not reach the radio wave of the vehicle-to-vehicle communication, the data can be sent by using the communication mesh network 3 in which the multiple vehicles 2 participate. At that time, since there are multiple routes due to the transmission route in a mesh shape, the vehicle 2 can select the optimum route for connection. In other words, when the optimum route cannot be used, it is possible to bypass the optimum route and connect the communication. That is, since the multiple vehicles 2 share the connection in the communication mesh network 3, even when one vehicle 2 is disconnected from the communication mesh network 3, the vehicle 2 detects another route for connection. Therefore, the connection is not disconnected.

The control unit 12 enables the vehicle to be connected to the external network 4 via the communication mesh network 3 when a period during which the vehicle cannot be directly connected to the external network 4 has elapsed for a predetermined time or longer, regardless of whether a disaster occurs.

Further, the vehicle 2 creating the communication mesh network 3 is not limited to a case in which the vehicle 2 is stopped, but may be moving. Further, the vehicle 2 is configured to be able to perform wireless communication by the communication unit 11 of the in-vehicle device 10 even when the ignition is turned off. That is, the communication mesh network 3 can be created even in the vehicle 2 in which the ignition is turned off.

Further, when the control unit 12 executes the display control, a color displayed on the windshield 20 can be changed to a different color according to the category of information, in addition to the character information. For example, the control unit 12 displays character information in blue on the windshield 20 in a state in which the vehicle cannot be connected to the external network 4, and the control unit 12 displays character information in red on the windshield 20 in a state in which the vehicle is connected to the external network 4 via the communication mesh network 3. Alternatively, when the vehicle cannot be connected to the external network 4, nothing may be displayed on the windshield 20.

Further, when the control unit 12 executes the display control, only the color information may be displayed on the windshield 20 without displaying the character information. For example, when the vehicle is connected to the external network 4 via the communication mesh network 3, the control unit 12 displays a predetermined area of the windshield 20 in red.

Further, the number of vehicles 2 participating in the communication mesh network 3 changes. That is, some vehicles 2 newly participate in the created communication mesh network 3, and some vehicles 2 are disconnected from the communication mesh network 3. Therefore, the shape and size of the entire network of the communication mesh network 3 change according to the number of vehicles 2 and the vehicle positions.

For example, the entire network of the communication mesh network 3 becomes large as the range in which the vehicles 2 participating in the communication mesh network 3 are located is expanded, and a range in which information can be acquired can be expanded. At that time, when a new vehicle 2 performs vehicle-to-vehicle communication with respect to the vehicles 2 participating in the communication mesh network 3, the entire network of the communication mesh network 3 is expanded. Further, even though the entire network of the communication mesh network 3 is not expanded, the mesh of the transmission route becomes finer as the vehicles 2 are more concentratedly arranged within a certain range, and thus, gaps in the range in which information can be acquired can be filled.

As described above, in the vehicle 2, even when the own vehicle is stopped, the relative positional relationship of the own vehicle changes due to the change of the entire network of the communication mesh network 3. Therefore, the control unit 12 is configured to determine the position of the own vehicle in the entire network of the communication mesh network 3. An example of this control is shown in FIG. 4.

FIG. 4 is a flowchart showing a control flow for determining the position of the own vehicle. The control shown in FIG. 4 is repeatedly executed by the control unit 12.

The control unit 12 determines whether the own vehicle participates in the communication mesh network 3 (step S201). In step S201, it does not matter whether the communication mesh network 3 is connected to the external network 4. In short, not only in a state in which the communication mesh network 3 is connected to the external network 4, but also in a state in which the communication mesh network 3 is not connected to the external network 4, the determination result in step S201 is Yes as long as the own vehicle participates in the communication mesh network 3.

When it is determined that the own vehicle does not participate in the communication mesh network 3 (step S201: No), this control routine ends.

On the other hand, when it is determined that the own vehicle participates in the communication mesh network 3 (step S201: Yes), the control unit 12 determines the position of the own vehicle in the entire network of the communication mesh network 3 (step S202). The in-vehicle device 10 includes a global positioning system (GPS) receiver. Further, the control unit 12 can acquire information indicating the current position of the vehicle 2 based on a positioning signal received by the GPS receiver. Further, when transmitting information by the communication mesh network 3, the control unit 12 transmits the information indicating the current position of the own vehicle. As a result, the vehicle 2 participating in the communication mesh network 3 can acquire the position information of another vehicle, so that the entire network of the communication mesh network 3 can be grasped. Then, in step S202, it is determined whether the own vehicle is located on the center side of the entire network of the communication mesh network 3. Further, in step S202, it is determined whether the own vehicle is located on the peripheral edge side of the entire network of the communication mesh network 3.

Then, the control unit 12 outputs information according to the position of the own vehicle in the entire network of the communication mesh network 3 as information that can be visually recognized from the outside of the vehicle (step S203). When the own vehicle is located on the center side of the entire network, in step S203, information indicating that the position of the own vehicle is on the center side of the entire network is output as the information that can be visually recognized from the outside of the vehicle. Alternatively, when the own vehicle is located on the peripheral edge side of the entire network, in step S203, information indicating that the position of the own vehicle is on the peripheral edge side of the entire network is output as the information that can be visually recognized from the outside of the vehicle.

A method of displaying the information on the windshield 20 can be applied to a method of outputting the information in step S203. That is, in step S203, the control unit 12 can display, on the windshield 20, the character information indicating that the own vehicle is located on the center side of the entire network and the character information indicating that the own vehicle is located on the peripheral edge side of the entire network. Further, the control unit 12 can display not only the character information but also the information in different colors.

Alternatively, a method of notifying the hazard lamp 30 of the information can be applied to the method of outputting the information in step S203. For example, when the own vehicle is located on the center side of the entire network, the control unit 12 blinks both the right and left hazard lamps 30. On the other hand, when the own vehicle is located on the peripheral edge side of the entire network, the control unit 12 blinks only one of the right and left hazard lamps 30 and turns off the other. Thereby, different information can be notified by using the hazard lamps 30. When the process of step S203 is executed, this control routine ends.

As described above, by outputting the positional information of the own vehicle relative to the entire network of the communication mesh network 3 to the outside of the vehicle, the person outside of the vehicle 2 can be notified of the range in which the information can be acquired by the communication mesh network 3. Further, when the shape and size of the entire network of the communication mesh network 3 change with the passage of time, the position relative to the entire network changes even though the own vehicle is continuously stopped. Therefore, the control unit 12 can notify the person outside of the vehicle of a change in the relative positional relationship in the entire network of the communication mesh network 3.

Further effects and modifications can be easily derived by those skilled in the art. The broader aspects of the present disclosure are not limited to the particular details and representative embodiments shown and described above. Accordingly, various modifications may be made without departing from the spirit or scope of the general inventive concept as defined by the appended claims and their equivalents.

What is claimed is:

1. A vehicle comprising a processor that includes hardware, wherein in response to an own vehicle being connected to an external network via a communication mesh network created by vehicle-to-vehicle communication that takes place between multiple vehicles, the processor outputs connection information, using at least one of displaying the information on the windshield, blinking a hazard lamp, or extending an antenna, indicating that the own vehicle is connected to the external network as information that is able to be visually recognized by a person outside of the vehicle.

2. The vehicle according to claim 1, wherein in response to the own vehicle being not able to be directly connected to the external network, the processor communicates with another vehicle that is able to perform the vehicle-to-vehicle communication and creates the communication mesh network.

3. The vehicle according to claim 1, wherein:
    in response to the own vehicle participating in the communication mesh network, the processor determines at which position the own vehicle is located in an entire network of the communication mesh network; and
    information according to a position of the own vehicle in the entire network is output as the information that is able to be visually recognized from the outside of the vehicle.

4. The vehicle according to claim 3, wherein in response to determination being made that the own vehicle is located on a center side of the entire network, the processor outputs information indicating that the position of the own vehicle is on the center side as the information that is able to be visually recognized from the outside of the vehicle.

5. The vehicle according to claim 3, wherein in response to determination being made that the own vehicle is located on a peripheral edge side of the entire network, the processor outputs information indicating that the position of the own vehicle is on the peripheral edge side as the information that is able to be visually recognized from the outside of the vehicle.

6. The vehicle according to claim 1, wherein in response to communication connection with the external network being disconnected from a state in which the own vehicle is connected to the external network via the communication mesh network, the processor outputs history information indicating that the own vehicle has been connected to the external network via the communication mesh network as the information that is able to be visually recognized from the outside of the vehicle.

7. The vehicle according to claim 6, wherein in response to the processor outputting the information that is able to be visually recognized from the outside of the vehicle, the processor displays various kinds of the information on a windshield of the own vehicle.

8. The vehicle according to claim 7, wherein in response to the processor displaying the various kinds of the information on the windshield, the processor changes a color displayed on the windshield to a different color according to a category of the information.

9. The vehicle according to claim 1, wherein in response to the own vehicle being connected to the external network via the communication mesh network, the processor blinks a hazard lamp of the own vehicle.

10. The vehicle according to claim 1, wherein in response to the processor outputting the information that is able to be visually recognized from the outside of the vehicle, the processor changes a length of an antenna of the own vehicle.

11. An in-vehicle device comprising a processor that includes hardware, wherein in response to an own vehicle being connected to an external network via a communication mesh network created by vehicle-to-vehicle communication that takes place between multiple vehicles, the processor outputs connection information, using at least one of displaying the information on the windshield, blinking a hazard lamp, or extending an antenna, indicating that the own vehicle is connected to the external network as information that is able to be visually recognized a person outside of the vehicle.

12. The in-vehicle device according to claim 11, wherein in response to the own vehicle being not able to be directly connected to the external network, the processor communicates with another vehicle that is able to perform the vehicle-to-vehicle communication and creates the communication mesh network.

13. The in-vehicle device according to claim 11, wherein:
    in response to the own vehicle participating in the communication mesh network, the processor determines at which position the own vehicle is located in an entire network of the communication mesh network; and
    information according to a position of the own vehicle in the entire network is output as the information that is able to be visually recognized from the outside of the vehicle.

14. The in-vehicle device according to claim 13, wherein in response to determination being made that the own vehicle is located on a center side of the entire network, the processor outputs information indicating that the position of the own vehicle is on the center side as the information that is able to be visually recognized from the outside of the vehicle.

15. The in-vehicle device according to claim 13, wherein in response to determination being made that the own vehicle is located on a peripheral edge side of the entire network, the processor outputs information indicating that the position of the own vehicle is on the peripheral edge side as the information that is able to be visually recognized from the outside of the vehicle.

16. The in-vehicle device according to claim 11, wherein in response to communication connection with the external network being disconnected from a state in which the own vehicle is connected to the external network via the communication mesh network, the processor outputs history information indicating that the own vehicle has been connected to the external network via the communication mesh network as the information that is able to be visually recognized from the outside of the vehicle.

17. The in-vehicle device according to claim 16, wherein in response to the processor outputting the information that is able to be visually recognized from the outside of the vehicle, the processor displays various kinds of the information on a windshield of the own vehicle.

18. The in-vehicle device according to claim 17, wherein in response to the processor displaying the various kinds of the information on the windshield, the processor changes a color displayed on the windshield to a different color according to a category of the information.

19. The in-vehicle device according to claim 11, wherein in response to the own vehicle being connected to the external network via the communication mesh network, the processor blinks a hazard lamp of the own vehicle.

20. The in-vehicle device according to claim 11, wherein in response to the processor outputting the information that is able to be visually recognized from the outside of the vehicle, the processor changes a length of an antenna of the own vehicle.

\* \* \* \* \*